(12) United States Patent
McCune

(10) Patent No.: US 10,233,772 B2
(45) Date of Patent: Mar. 19, 2019

(54) FAN AXIAL CONTAINMENT SYSTEM

(71) Applicant: UNITED TECHNOLOGIES CORPORATION, Farmington, CT (US)

(72) Inventor: Michael E. McCune, Colchester, CT (US)

(73) Assignee: UNITED TECHNOLOGIES CORPORATION, Farmington, CT (US)

(\*) Notice: Subject to any disclaimer, the term of this patent is extended or adjusted under 35 U.S.C. 154(b) by 696 days.

(21) Appl. No.: 14/770,599

(22) PCT Filed: Mar. 13, 2014

(86) PCT No.: PCT/US2014/025804
§ 371 (c)(1),
(2) Date: Aug. 26, 2015

(87) PCT Pub. No.: WO2014/151470
PCT Pub. Date: Sep. 25, 2014

(65) Prior Publication Data
US 2016/0003093 A1    Jan. 7, 2016

Related U.S. Application Data

(60) Provisional application No. 61/788,686, filed on Mar. 15, 2013.

(51) Int. Cl.
*F01D 21/04* (2006.01)
*F02C 7/06* (2006.01)
(Continued)

(52) U.S. Cl.
CPC .............. *F01D 21/045* (2013.01); *F01D 5/02* (2013.01); *F01D 15/12* (2013.01); *F01D 17/06* (2013.01);
(Continued)

(58) Field of Classification Search
CPC ........ F01D 15/12; F01D 17/06; F01D 21/045; F01D 21/08; F01D 25/162; F01D 25/24;
(Continued)

(56) References Cited

U.S. PATENT DOCUMENTS 6,109,022 A    8/2000  Allen et al.
7,694,505 B2   4/2010  Schilling
(Continued)

FOREIGN PATENT DOCUMENTS

DE    19727296 A1    1/1999
EP    2535528 A2    12/2012
(Continued)

OTHER PUBLICATIONS

International Search Report Application No. PCT/US2014/020264, reported on Dec. 12, 2014.
(Continued)

*Primary Examiner* — Mark Laurenzi
*Assistant Examiner* — Paul Thiede
(74) *Attorney, Agent, or Firm* — Cantor Colburn LLP

(57) ABSTRACT

A gas turbine engine (20) and method for containing a fan inside an engine after a fan thrust bearing assembly failure. The engine (20) may comprise a fan (42), a housing (100) including a compartment (102), a fan shaft (104) inside the compartment (102) and comprising a bowl (108), a support structure (110) inside the compartment (102), a speed sensor pickup (114) mounted on the outer surface (120) of the bowl (108), a speed sensor (112) mounted on the support structure (110), and a fan thrust bearing assembly (41) disposed forward of the bowl (108). The fan thrust bearing assembly (41) including a bearing (126). The speed sensor (112) and the sensor pickup (114) define a defining a sensor gap (116). The bearing (126) and the outer surface (120) defining a fan
(Continued)

thrust bearing gap (130), wherein the sensor gap (116) is less than the fan thrust bearing gap.

20 Claims, 3 Drawing Sheets

(51) Int. Cl.
    *F01D 21/08*     (2006.01)
    *F01D 5/02*     (2006.01)
    *F01D 15/12*     (2006.01)
    *F01D 17/06*     (2006.01)
    *F01D 25/16*     (2006.01)
    *F01D 25/24*     (2006.01)

(52) U.S. Cl.
    CPC ........... *F01D 21/08* (2013.01); *F01D 25/162* (2013.01); *F01D 25/24* (2013.01); *F02C 7/06* (2013.01); *F05D 2220/36* (2013.01); *F05D 2240/52* (2013.01); *F05D 2260/83* (2013.01); *Y02T 50/671* (2013.01)

(58) Field of Classification Search
    CPC .......... F01D 5/02; F02C 7/06; F05D 2220/36; F05D 2240/52; F05D 2260/83; Y02T 50/671

USPC ...................................... 415/9; 60/204, 226.1
See application file for complete search history.

(56) References Cited

U.S. PATENT DOCUMENTS

| | | |
|---|---|---|
| 2007/0006569 A1 | 1/2007 | Brault et al. |
| 2007/0084189 A1 | 4/2007 | Moniz et al. |
| 2012/0195753 A1 | 8/2012 | Davis et al. |
| 2012/0263579 A1 | 10/2012 | Otto et al. |

FOREIGN PATENT DOCUMENTS

| | | |
|---|---|---|
| WO | 2013115921 A1 | 8/2013 |
| WO | 2013151955 A1 | 10/2013 |

OTHER PUBLICATIONS

English Translation to DE 19727296 Abstract.
English Translation to DE 19727296 Specification and Claims.
European Search Report for Application No. EP 14769463.

FAN AXIAL CONTAINMENT SYSTEM

CROSS-REFERENCE TO RELATED PATENT APPLICATIONS

This patent application is a US National Stage under 35 U.S.C. § 371, claiming priority to International Application No. PCT/US2014/025804 filed on Mar. 13, 2014, which claims priority under 35 U.S.C. § 119(e) to U.S. Patent Application Ser. No. 61/788,686 filed on Mar. 15, 2013.

TECHNICAL FIELD

The present disclosure generally relates to gas turbine engines and, more particularly, gas turbine engines in which a compartment housing the fan thrust bearing and geared architecture is disposed adjacent to the low pressure compressor.

BACKGROUND

Gas turbine engines typically include a compressor, at least one combustor in a combustor section, and a turbine. The compressor and turbine each include alternating rings of stationary vanes, and rotating blades. A fan delivers air into the compressor where the air is compressed and then delivered downstream into the combustor section. In the combustor section, the air received from the compressor is mixed with fuel and ignited to create combustion gases that enter the turbine. The turbine is rotatably driven as the high temperature, high pressure combustion gases expand in passing over the blades forming the turbine. Since the turbine is connected to the compressor via one or more shafts, the combustion gases that drive the turbine also drive the compressor, thereby restarting the ignition and combustion cycle.

The compressor in a gas turbine engine typically comprises a low pressure compressor section and a high pressure compressor section. For example, a turbofan jet engine includes a low pressure compressor section disposed between the fan at the inlet of the engine and the high pressure compressor section. The low pressure compressor section and the high pressure compressor section increase the pressure of the incoming air stream as it flows along a core air flow path. Both the low pressure compressor section and high pressure compressor section include alternating rings of stationary vanes and rotating blades enclosed in a circumferential case.

A compartment is disposed between the low pressure compressor section and the engine longitudinal axis. The compartment is disposed around a forward bearing, a fan thrust bearing, and at least the portion of the fan shaft that encloses the geared architecture that drives the fan. If the event of a failure of the fan thrust bearing, the fan shaft and geared architecture may move forward within the compartment toward the front of the engine and, possibly, out of the engine. Such movement is undesireable.

SUMMARY OF THE DISCLOSURE

In accordance with one aspect of the disclosure, a gas turbine engine disposed about a longitudinal engine axis is disclosed. The engine may comprise a fan, an exterior housing including an interior compartment disposed adjacent to the fan, a fan shaft disposed inside the compartment, a fan bearing support structure disposed inside the compartment, a speed sensor pickup, a speed sensor, and a fan thrust bearing assembly. The fan shaft is configured to drive the fan. The fan shaft may comprise an elongated pole and a bowl, the bowl including an outer surface and an inner surface. The speed sensor pickup may be mounted on the outer surface of the bowl. The speed sensor may be mounted on the fan bearing support structure. The speed sensor and the sensor pickup define a sensor gap in the axial direction. The fan thrust bearing assembly is disposed forward of the bowl. The fan thrust bearing assembly may include a bearing. The bearing and the outer surface of the bowl defining in the axial direction a fan thrust bearing gap, wherein the sensor gap is less than the fan thrust bearing gap.

In an embodiment, the fan thrust bearing assembly may include mounting hardware. The fan thrust bearing assembly may be disposed adjacent to the pole and may be mounted, below the speed sensor, to the fan bearing support structure by the mounting hardware. In a refinement, the mounting hardware and the outer surface of the bowl define a mounting gap in the axial direction. The mounting gap is greater than the sensor gap.

In another embodiment, the gas turbine engine may further comprise a component mounted directly to the outer surface of the bowl. The sensor gap is less than an axial distance between the bearing and the component.

In another embodiment, the gas turbine engine may further comprise a core flow path extending along the engine axis. The core flow path may be configured to guide air from the fan through the engine. The compartment may be disposed radially inward of the core flow path.

In another embodiment, the gas turbine engine may further comprise geared architecture disposed inside the bowl. A perimeter of the geared architecture and the inner surface of the bowl may define a Geared Architecture to Inner Surface (GAIS) gap. Wherein the sensor gap is less than the GAIS gap. In a refinement, the sensor pickup may include pickup sensor attachment hardware disposed inside the bowl. The sensor gap is less than an axial distance between the pickup sensor attachment hardware and the perimeter of the Geared Architecture.

In accordance with another aspect of the disclosure, a method for containing a fan inside a housing of a gas turbine engine after a fan thrust bearing assembly failure is disclosed. The engine may include the housing, the fan thrust bearing assembly and a fan shaft. The housing may include an interior compartment. The fan shaft may be disposed in the interior compartment and may be configured to drive the fan. The fan may be disposed forward of the fan thrust bearing assembly. The fan thrust bearing assembly may be disposed inside the interior compartment. The method may comprise contacting a speed sensor by a speed sensor pickup when the fan shaft moves axially forward after a failure of the fan thrust bearing assembly, detecting, by a controller, a loss of signal from the speed sensor resulting from the contacting, shutting down the engine and moving the fan aft onto a forward bearing assembly. The speed sensor and speed sensor pickup are disposed in the interior compartment. The forward bearing assembly and the fan thrust bearing assembly disposed in the interior compartment, the forward bearing assembly disposed aft of the fan and forward of the fan thrust bearing assembly.

In an embodiment, the moving of the fan aft onto the forward bearing assembly is via ram force.

In another embodiment, fan shaft may include an elongated pole and a bowl. The speed sensor pickup may be mounted on the outer surface of the bowl. In a refinement, the fan thrust bearing assembly may be disposed adjacent to the pole and the bowl. In an embodiment, the speed sensor may be mounted proximal to the speed sensor pickup disposed on the fan shaft.

In an embodiment, the sensor and the sensor pickup define a sensor gap in the axial direction. The sensor gap may be less than any other gap in the axial direction between the contents of the interior compartment disposed forward of the bowl and an outer surface of the bowl. In a refinement, the fan thrust bearing assembly may include a bearing. The bearing and the outer surface of the bowl may define in the axial direction a fan thrust bearing gap. The sensor gap may be less than the fan thrust bearing gap. In another refinement, the engine may further include Geared Architecture disposed inside the bowl. A perimeter of the Geared Architecture and the inner surface of the bowl define a GAIS gap. The sensor gap is less than the GAIS gap.

In an embodiment, the loss of signal is a loss of a fan to low pressure turbine shaft ratio signal.

In accordance with a further aspect of the disclosure, a gas turbine engine having an engine axis is disclosed. The engine may comprise a gas generator that includes a core flow path, a propulsor and a housing. The propulsor may include a fan, a fan shaft and geared architecture that drives the fan. The fan shaft may comprise an elongated pole and a bowl. The geared architecture may be disposed within the bowl of the fan shaft. The housing may define a compartment adjacent to the fan and the core flow path. The compartment may include a fan bearing support structure and may enclose a forward bearing assembly, a fan thrust bearing assembly, the bowl, a sensor mounted on the fan bearing support structure, and a speed sensor pickup mounted on an outer surface of the bowl. The fan thrust bearing assembly may be disposed between the forward bearing assembly and the bowl. The speed sensor pickup and the sensor may define a sensor gap in the axial direction. The sensor gap in the axial direction may be less than a GAIS gap in the axial direction between the geared architecture and an inner surface of the bowl, or any other gap in the axial direction between the bowl and the fan thrust bearing assembly.

In an embodiment, the fan thrust bearing assembly may include mounting hardware. The fan thrust bearing assembly may be disposed adjacent to the pole and may be mounted, below the speed sensor, to the support structure by the mounting hardware. In a refinement, the mounting hardware and the outer surface of the bowl may define a mounting gap in the axial direction. The mounting gap is greater than the sensor gap.

In another embodiment, the gas turbine engine may be a geared turbofan engine.

DETAILED DESCRIPTION

Figure 1:
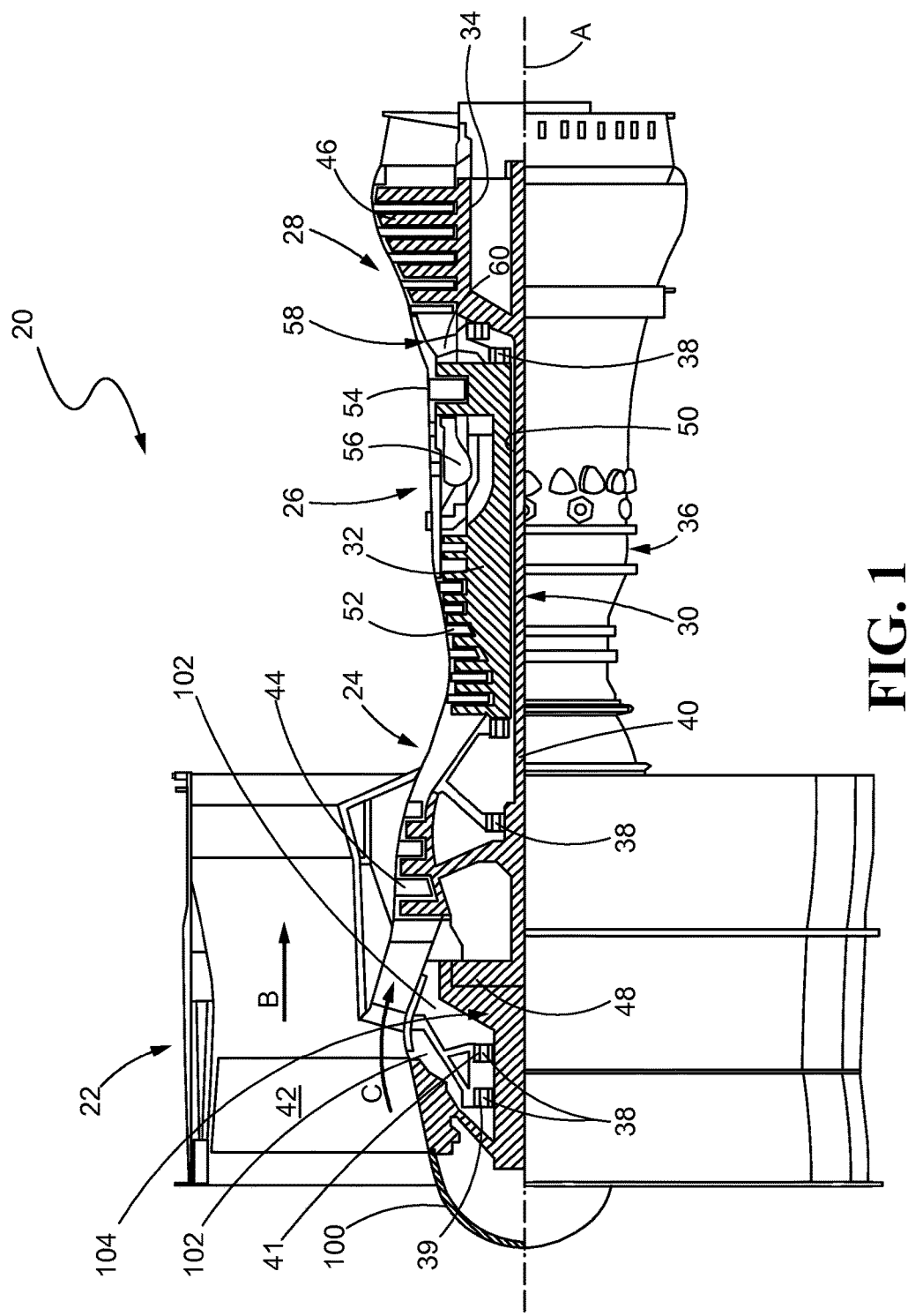
FIG. 1 is a schematic longitudinal sectional view of an exemplary turbofan gas turbine engine that includes a compartment as disclosed herein.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. The engine central longitudinal axis A defines an axial direction. It should be understood that various bearing systems 38 at various locations may alternatively or additionally be provided.

The low speed spool 30 generally includes an inner shaft 40 that connects a fan shaft 104 and a low pressure (or first) compressor section 44 to a low pressure (or first) turbine section 46. A fan 42 is mounted on the forward end of the fan shaft 104. The inner shaft 40 drives the fan shaft 104 through a speed change device, such as the geared architecture 48 contained in the fan shaft 104, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10).

Figure 2:
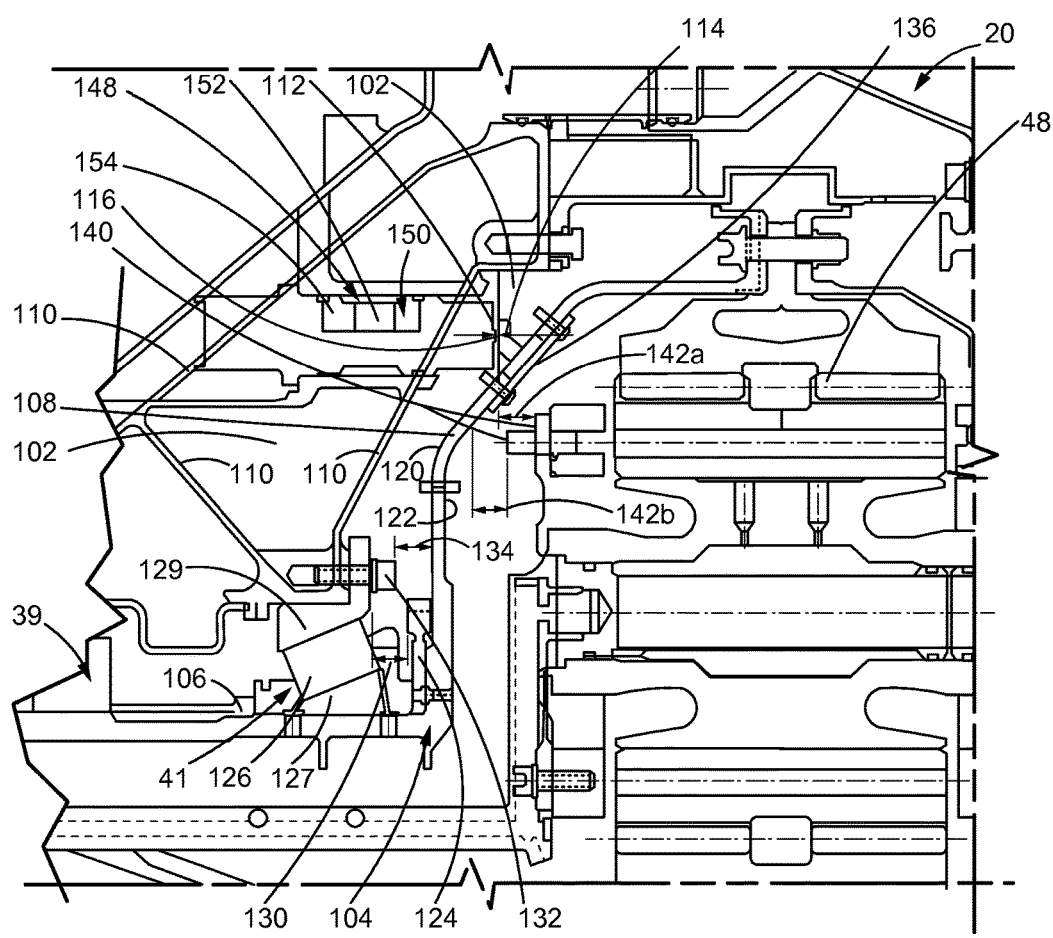
FIG. 2 is a partial sectional view of a turbofan gas turbine engine, illustrating the compartment.

The example geared architecture 48 may be an epicyclical gear train, such as a planetary gear system, star gear system or other known speed change gear system that provides gear reduction between the low speed spool 30 and the fan 42 that results in the fan 42 being driven at a lower speed than the low speed spool 30 "Geared Architecture". In the embodiment of FIG. 2, the Geared Architecture is an epicyclical gear train with a gear reduction ratio of greater than about 2.3, in other embodiments, the Geared Architecture may be another gear system.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a Geared Architecture and that the present disclosure is applicable to other gas turbine engines.

A significant amount of thrust is provided by the air in the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram \,°\, R)/(518.7°\, R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the Geared Architecture 48 and the gear reduction that it provides between the low speed spool 30 and the fan 42 allows an increase of speed to the low pressure compressor 44. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused partially by a desire to not have unduly high fan speeds.

As can be seen in FIG. 1, a generally annular exterior housing 100 defines a first interior compartment 102 that encloses the fan shaft 104 and the Geared Architecture 48 contained within the fan shaft 104. The compartment 102 may be disposed between the core flow path C and the engine central longitudinal axis A. In other words, the compartment 102 may be disposed radially inward of the core flow path C. The compartment 102 is adjacent to the fan 42. Since the fan 42 is mounted on the forward end of the fan shaft 104, a portion of the fan 42 is disposed inside the compartment 102 and a portion is outside of the compartment 102.

Referring now to FIG. 2, there is shown an enlarged schematic view of a selected portion of the exemplary gas turbine engine 20 of FIG. 1. The fan shaft 104 includes an elongated pole 106 and a bowl 108. The bowl 108 includes an outer surface 120 and an inner surface 122.

The Geared Architecture 48 is disposed within the bowl 108 of the fan shaft 104. Such Geared Architecture 48, as described earlier herein, may have an outer perimeter 140. The outer perimeter 140 of the geared architecture (48) and the inner surface (122) of the bowl (108) defining a Geared Architecture to Inner Surface (GAIS) gap (142) in the axial direction. Such GAIS gaps may be measured fore to aft (on a line parallel to the engine central longitudinal axis A) from inner surface 122 of the bowl 108 to the outer perimeter 140 of the Geared Architecture 48. Herein the term "axial direction" means in a direction fore to aft along or parallel to the engine central longitudinal axis A. In some embodiments, a component such as speed sensor pickup attachment hardware 136 may be mounted to the inner surface 122 of the bowl 108, in this case the GAIS gap 142 in the axial direction may extend between the component 136 and the outer perimeter 140 of the Geared Architecture 48, the measurement taken fore to aft along or parallel to the engine central longitudinal axis A. In FIG. 2, two such GAIS gaps may be seen, 142a and 142b. The first GAIS gap 142a is between speed sensor pickup attachment hardware 136 that attaches the speed sensor pickup (discussed later) to the bowl 108 and an outer perimeter 140 of the Geared Architecture 48. The second illustrated GAIS gap 142b may be seen between the inner surface 122 of the bowl 108 and the outer perimeter 140 of the Geared Architecture 48. Other GAIS gaps are possible.

As can be seen in FIG. 2, the compartment 102 further contains a fan bearing support structure 110 and encloses a forward bearing assembly 39, a fan thrust bearing assembly 41, the bowl 108, a speed sensor 112 mounted on the fan bearing support structure 110, and a speed sensor pickup 114 mounted on the outer surface 120 of the bowl 108. The fan thrust bearing assembly 41 is disposed between the forward bearing assembly 39 and the bowl 108. The fan thrust bearing assembly 41 may be disposed adjacent to the pole 106 and may be generally positioned below the fan bearing support structure 110. The fan thrust bearing assembly 41 may include a bearing 126, a bearing cradle bottom 127, a bearing cradle top 129 and mounting hardware 132. The fan thrust bearing assembly 41 may be mounted to the fan bearing support structure 110 by the mounting hardware 132. The bearing 126 and the outer surface 120 of the bowl 108 defining in the axial direction a fan thrust bearing gap 130 at the point of the smallest distance (as measured on a line parallel to engine central longitudinal axis A) between the bearing 126 and the outer surface 120 of the bowl 108, or the smallest distance (as measured on a line parallel to engine central longitudinal axis A) between the bearing 126 and a component 124 mounted to the outer surface 120 of the bowl 108 (the latter applicable for those embodiments where, at the point of the smallest distance, a component 124 mounted to the outer surface 120 is disposed between the bearing 126 and the bowl 108). The mounting hardware 132 and the outer surface 120 of the bowl 108 may define a mounting gap 134 in the axial direction (as measured on a line parallel to engine central longitudinal axis A).

The speed sensor pickup 114 and the speed sensor 112 define a sensor gap 116 in the axial direction (as measured on a line parallel to engine central longitudinal axis A). The sensor gap 116 in the axial direction is less than any gap in the axial direction between the Geared Architecture 48 and the inner surface of the bowl 108 (GAIS gap) forward of the Geared Architecture. The sensor gap 116 in the axial direction is less than the fan thrust bearing gap 130. The sensor gap 116 in the axial direction is less than the mounting gap 134. In addition, the sensor gap 116 is also less than any other axial gap between the outer surface 120 of the bowl 108 (including components mounted to it) and the remaining contents of the compartment 102 (those contents axially forward of the bowl 108).

The engine has an overspeed protection system, the Full Authority Digital Engine Control System (FADEC) 148 which senses the speed ratio between the low pressure turbine shaft 40 and the fan 42. In an embodiment, the FADEC may include a controller 150. Alternatively, the FADEC may send signals to a controller 150 outside of the FADEC for processing.

The controller 150 may include a processor 152 and a memory component 154. The processor 152 may be a microprocessor or other processor as known in the art. The processor 152 may execute instructions and generate control signals for determining the speed ratio between the low pressure turbine shaft 40 and the fan 42, and commanding a fuel cutoff. Such instructions that are capable of being executed by a computer may be read into or embodied on a computer readable medium, such as the memory component 154 or provided external to the processor 152. In alternative embodiments, hard wired circuitry may be used in place of, or in combination with, software instructions to implement a control method.

The term "computer readable medium" as used herein refers to any non-transitory medium or combination of media that participates in providing instructions to the processor 152 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 152 can read. The controller 150 is not limited to one processor 152 and memory component 154. The controller 150 may be several processors 152 and memory components 154.

If a change in speed ratio is detected due to shaft shear, the FADEC System 148 will command a fuel cutoff and the engine 20 shuts down. A change in ratio may be detected when there is a signal loss from the sensor 112 or the sensor 112 does not transmit a signal to the FADEC System 148.

In the event of a fan thrust bearing assembly 41 failure, the fan shaft 104 and bowl 108 will move forward toward the front of the engine 20. Because the sensor gap 116 is the smallest gap in the axial direction, the sensor 112 and sensor pickup 114 will collide before any other components in the compartment 102. The result of this collision is that the sensor 112 will cease sending signals to the FADEC System 148.

The FADEC System 148 will sense this loss of signal from the sensor 112 and transmit a signal cutting off the fuel to the engine 20. This causes the engine 20 to shut down. Ram pressure will then move the fan 42 rearward onto the forward bearing assembly 39. This ensures containment of the fan bowl 108 and the geared architecture 48 in the compartment 102.

Figure 3:
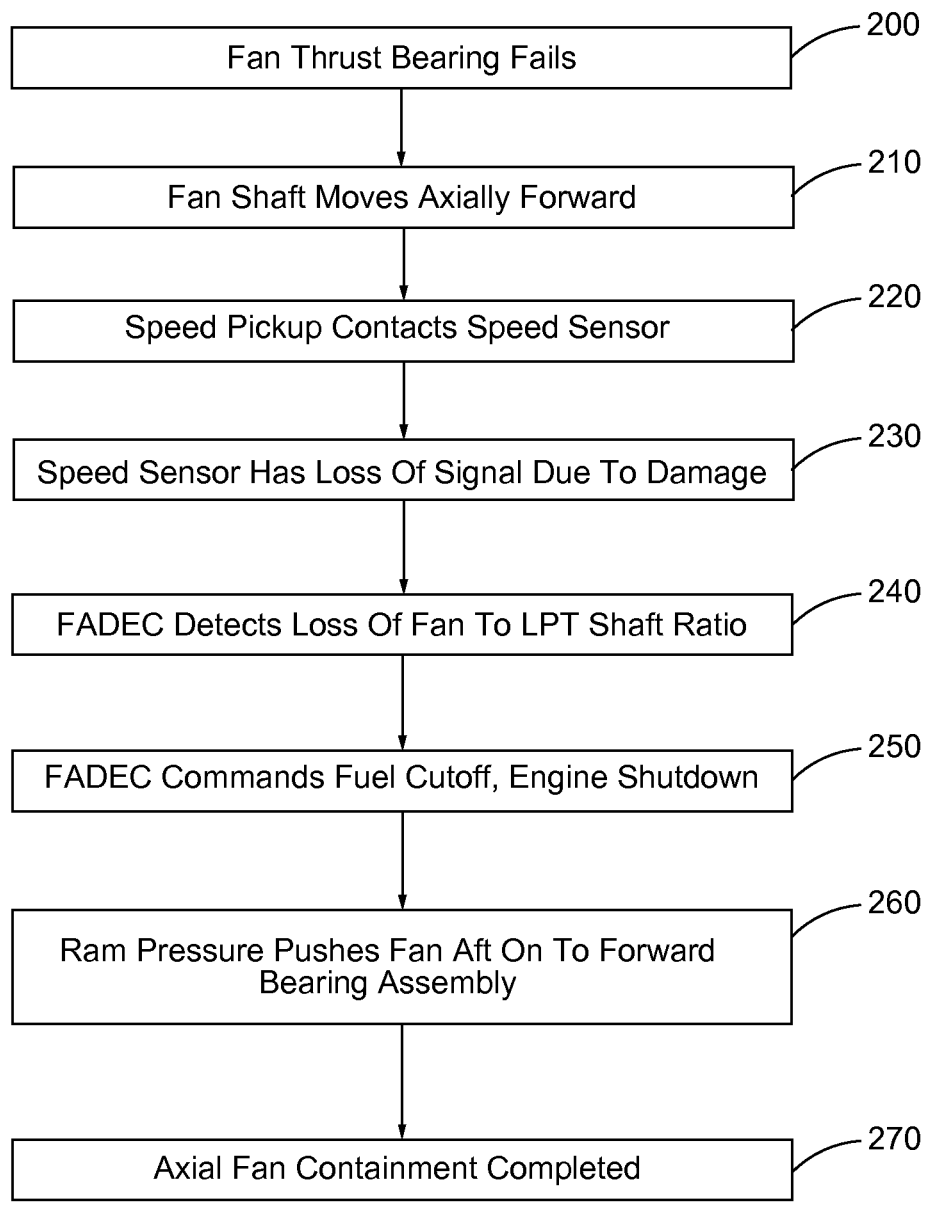
FIG. 3 is a flow chart illustrating sample steps of a process which may be followed in accordance with the disclosure herein.

Referring to FIG. 3, also disclosed is a method that may be used to contain the fan shaft 104 and the geared architecture 48 in the compartment 102 in the event of a fan thrust bearing assembly 41 failure. In block 200 the fan thrust bearing assembly 41 fails. In block 210, the fan shaft 104 moves axially forward. In block 220, the speed sensor pickup 114 contacts the speed sensor 112. In block 230, the contact results in a loss of signal from the speed sensor 112 due to damage. In block 240, the FADEC system 148 detects a loss of the fan to low pressure turbine shaft ratio. In block 250, the FADEC system 148 commands fuel cutoff and the engine 20 shuts down. In step 260, ram pressure pushes the fan 42 aft back on to the forward bearing assembly 39. In block 270, the axial fan shaft 104 and the geared architecture 48 enclosed in the fan shaft 104 are contained in the compartment 102.

INDUSTRIAL APPLICABILITY

In the event of a fan thrust bearing assembly failure, the fan shaft and geared architecture move forward in the compartment and may result in damage to the engine. A benefit of this design is that the speed sensor and the speed sensor pickup will be the first two components that collide when the fan shaft moves forward. The collision will cause a loss of signal to the FADEC System. The loss of signal will result in fuel cutoff and the engine shutting down. This minimizes damage to the engine and increases the likelihood that the fan shaft and the geared architecture will remain within the appropriate part of the engine.

Such a design can replace metal interlocks, reduce engine weight and cost while increasing the reaction time to bearing failure.

What is claimed is:
1. A gas turbine engine disposed about a longitudinal engine axis (A), the engine comprising:
  a fan;
  an exterior housing including an interior compartment disposed adjacent to the fan;
  a fan shaft disposed inside the compartment, the fan shaft configured to drive the fan, the fan shaft comprising an elongated pole and a bowl, the bowl including an outer surface and an inner surface;

a forward bearing assembly forward of the bowl;

a fan bearing support structure disposed inside the compartment;

a speed sensor pickup mounted on the outer surface of the bowl;

a speed sensor mounted on the fan bearing support structure, the speed sensor and the sensor pickup defining a sensor gap in the axial direction; and a fan thrust bearing assembly disposed forward of the bowl, the fan thrust bearing assembly including a bearing, the bearing and the outer surface of the bowl defining in the axial direction a fan thrust bearing gap, wherein the sensor gap is less than the fan thrust bearing gap.

2. The gas turbine engine of claim 1, in which the fan thrust bearing assembly includes mounting hardware, wherein the fan thrust bearing assembly is disposed adjacent to the pole and is mounted below the speed sensor to the fan bearing support structure by the mounting hardware.

3. The gas turbine engine of claim 2, wherein the mounting hardware and the outer surface of the bowl define a mounting gap in the axial direction, the mounting gap greater than the sensor gap.

4. The gas turbine engine of claim 1, further comprising a component mounted directly to the outer surface of the bowl, the sensor gap less than an axial distance between the bearing and the component.

5. The gas turbine engine of claim 1 further comprising a core flow path extending along the engine axis, the core flow path configured to guide air from the fan through the engine, wherein the compartment is disposed radially inward of the core flow path.

6. The gas turbine engine of claim 1, further comprising geared architecture disposed inside the bowl, a perimeter of the geared architecture and the inner surface of the bowl defining a Geared Architecture to Inner Surface (GAIS) gap, wherein the sensor gap is less than the GAIS gap.

7. The gas turbine engine of claim 6, in which the sensor pickup includes pickup sensor attachment hardware disposed inside the bowl, wherein the sensor gap is less than an axial distance between the pickup sensor attachment hardware and the perimeter of the geared architecture.

8. A method for containing a fan inside a housing of a gas turbine engine after a fan thrust bearing assembly failure, the engine including the housing, the fan thrust bearing assembly and a fan shaft, the housing including an interior compartment, the fan shaft disposed in the interior compartment and configured to drive the fan, the fan disposed forward of the fan thrust bearing assembly, the fan thrust bearing assembly disposed inside the interior compartment, the method comprising:

contacting a speed sensor by a speed sensor pickup when the fan shaft moves axially forward after a failure of the fan thrust bearing assembly;

detecting, by a controller, a loss of signal from the speed sensor resulting from the contacting;

shutting down the engine; and moving the fan aft onto a forward bearing assembly, the forward bearing assembly and the fan thrust bearing assembly disposed in the interior compartment, the forward bearing assembly disposed aft of the fan and forward of the fan thrust bearing assembly.

9. The method of claim 8, wherein the moving the fan aft onto the forward bearing assembly is via ram force.

10. The method of claim 8, the fan shaft including an elongated pole and a bowl, the speed sensor pickup mounted on the outer surface of the bowl.

11. The method of claim 10, wherein the fan thrust bearing assembly is disposed adjacent to the pole and the bowl.

12. The method of claim 8, wherein the speed sensor is mounted proximal to the speed sensor pickup disposed on the fan shaft.

13. The method of claim 8, wherein the sensor and the speed sensor pickup define a sensor gap in the axial direction, the sensor gap less than any other gap in the axial direction between the contents of the interior compartment disposed forward of the bowl and an outer surface of the bowl.

14. The method of claim 13, wherein the fan thrust bearing assembly includes a bearing, the bearing and the outer surface of the bowl defining in the axial direction a fan thrust bearing gap, wherein the sensor gap is less than the fan thrust bearing gap.

15. The method of claim 13, wherein the engine further includes geared architecture disposed inside the bowl, wherein a perimeter of the Geared Architecture and the inner surface of the bowl define a Geared Architecture to Inner Surface (GAIS) gap, wherein further the sensor gap is less than the GAIS gap.

16. The method of claim 8, wherein the loss of signal is a loss of fan to low pressure turbine shaft ratio signal.

17. A gas turbine engine having an engine axis, the engine comprising:

a gas generator that includes a core flow path;

a propulsor that includes a fan, a fan shaft and geared architecture that drives the fan, the fan shaft comprising an elongated pole and a bowl, the geared architecture disposed within the bowl of the fan shaft; and a housing defining a compartment adjacent to the fan and the core flow path, the compartment including a fan bearing support structure and enclosing a forward bearing assembly forward of the bowl, a fan thrust bearing assembly, the bowl, a speed sensor mounted on the fan bearing support structure, and a speed sensor pickup mounted on an outer surface of the bowl, the fan thrust bearing assembly disposed between the forward bearing assembly and the bowl, the speed sensor pickup and the speed sensor defining a sensor gap in the axial direction, wherein the sensor gap in the axial direction is less than a Geared Architecture to Inner Surface (GAIS) gap in the axial direction between the geared architecture and an inner surface of the bowl or a gap in the axial direction between the bowl and the fan thrust bearing assembly.

18. The gas turbine engine of claim 17, in which the fan thrust bearing assembly includes mounting hardware, wherein the fan thrust bearing assembly is disposed adjacent to the pole and is mounted, below the speed sensor, to the support structure by the mounting hardware.

19. The gas turbine engine of claim 18, wherein the mounting hardware and the outer surface of the bowl define a mounting gap in the axial direction, the mounting gap greater than the sensor gap.

20. The gas turbine engine of claim 17, gas turbine engine is a geared turbofan engine.

* * * * *